US012668663B2

(12) United States Patent
Banach

(10) Patent No.: US 12,668,663 B2
(45) Date of Patent: Jun. 30, 2026

(54) MODIFIED POLY(PHENYLENE ETHER) COPOLYMERS, COMPOSITIONS, AND METHODS THEREOF

(71) Applicant: SHPP GLOBAL TECHNOLOGIES B.V., Bergen op Zoom (NL)

(72) Inventor: Timothy Edward Banach, Scotia, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 721 days.

(21) Appl. No.: 17/914,490

(22) PCT Filed: Mar. 26, 2021

(86) PCT No.: PCT/IB2021/052541

§ 371 (c)(1),
(2) Date: Sep. 26, 2022

(87) PCT Pub. No.: WO2021/191869

PCT Pub. Date: Sep. 30, 2021

(65) Prior Publication Data

US 2023/0115320 A1 Apr. 13, 2023

(30) Foreign Application Priority Data

Mar. 26, 2020 (EP) .................................... 20165893

(51) Int. Cl.
*C08G 65/48* (2006.01)
*C08G 77/46* (2006.01)
*C08G 101/00* (2006.01)

(52) U.S. Cl.
CPC ........... *C08G 65/485* (2013.01); *C08G 77/46* (2013.01); *C08G 2101/00* (2013.01); *C08G 2150/00* (2013.01); *C08G 2170/00* (2013.01); *C08G 2190/00* (2013.01); *C08G 2650/20* (2013.01)

(58) Field of Classification Search
CPC .. C08G 65/485; C08G 77/46; C08G 2650/20; C09D 183/12; C09J 183/12; C08L 83/12
See application file for complete search history.

(56) References Cited

U.S. PATENT DOCUMENTS 3,018,290 A 1/1962 Sauers et al.
3,306,874 A 2/1967 Hay
4,304,705 A 12/1981 Heilmann et al.
4,540,763 A 9/1985 Kirchhoff
4,642,126 A 2/1987 Zador et al.
4,642,329 A 2/1987 Kirchhoff et al.
4,652,274 A 3/1987 Boettcher et al.
4,661,193 A 4/1987 Kirchhoff et al.
4,724,260 A 2/1988 Kirchhoff et al.
4,743,399 A 5/1988 Kirchhoff et al.
5,162,449 A 11/1992 Sivavec et al.
5,391,650 A 2/1995 Brennan et al.
5,543,516 A 8/1996 Ishida
5,922,815 A 7/1999 Aycock et al.
6,627,704 B2 9/2003 Yeager et al.
8,722,837 B2 5/2014 Carrillo et al.
2010/0119716 A1* 5/2010 Chapman Irwin ....... H01B 3/30 525/391

FOREIGN PATENT DOCUMENTS

CN 106609030 * 12/2018 ................ C08J 5/24
EP 0467115 A1 1/1992
EP 0540106 A1 5/1993
EP 3567068 A1 11/2019
JP 2008-115280 * 5/2008
WO 0140353 A1 6/2001
WO 2009104107 A1 8/2009

OTHER PUBLICATIONS

Machine translation of description section of JP2008-115280 (Year: 2008).*
Machine translation of CN 106609030 description section (Year: 2018).*
Ilawa, Takashi et al.; "Synthesis of rigid polymer containing pendant norbornadiene moieties and its photochemical valence isomerization"; Journal of Polymer Science, Part A , Polymer Chemistry, vol. 32 (16), 1994, p. 3091-3098.
International Search Report for International Applicaton No. PCT/IB2021/052541; International Filing Date: Mar. 26, 2021; Date of Mailing: Jul. 21, 2021; 5 pages.
Ning et al., "Phenolic Materials via Ring-opening Polymerization: Synthesis and Characterization of Bisphenol-A Based Benzoxazines and Their Polymers", Journal of Polymer Science, Chemistry Edition, vol. 32, p. 1121 (1994).

(Continued)

*Primary Examiner* — John M Cooney
*Assistant Examiner* — Adam J Berro
(74) *Attorney, Agent, or Firm* — Stites & Harbison, PLLC

(57) ABSTRACT

A poly(phenylene ether) copolymer comprising first repeating units comprising a $C_{1-6}$alkyl($C_{6-30}$cycloalkenyl) pendant group; second repeating units different from the first repeating units; a copolymer of Formula (3); and optionally, at least one terminal functional group comprising (meth)acrylate, styrene, $—CH_2—(C_6H_4)—CH{=}CH_2$, allyl, cyanate ester, glycidyl ether, anhydride, aniline, maleimide, an activated ester, or a combination thereof.

(3)

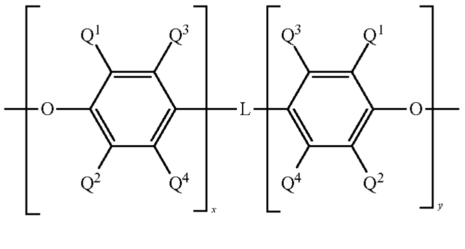

15 Claims, No Drawings

(56) References Cited

OTHER PUBLICATIONS

Written Opinion for International Applicaton No. PCT/IB2021/052541; International Filing Date: Mar. 26, 2021; Date of Mailing: Jul. 21, 2021; 7 pages.

* cited by examiner

MODIFIED POLY(PHENYLENE ETHER) COPOLYMERS, COMPOSITIONS, AND METHODS THEREOF

CROSS REFERENCE TO RELATED APPLICATIONS

This application is a National Stage application of PCT/IB2021/052541, filed Mar. 26, 2021, which claims priority to European Application No. 20165893.7 filed on Mar. 26, 2020, both of which are incorporated by reference in their entirety herein.

BACKGROUND

This disclosure relates to poly(phenylene ether) copolymers, and in particular to modified poly(phenylene ether) copolymers, poly(phenylene ether) copolymer compositions, methods of manufacture, and uses thereof.

Thermosetting resins are materials that cure to form very hard plastics. These materials that can be used in a wide variety of consumer and industrial products. For example, thermosets are used in protective coatings, adhesives, electronic laminates (such as those used in the fabrication of computer circuit boards), flooring, and paving applications, glass fiber-reinforced pipes, and automotive parts (including leaf springs, pumps, and electrical components). Poly(polyphenylene ether)s generally have good dielectric properties. Because of their broad use, particularly in electronic applications, such as laminates for printed circuit boards, it is desirable to provide thermoset compositions including poly(phenylene ether) copolymers with high glass transition temperatures while maintaining or improving the dielectric properties.

There accordingly remains a need in the art for poly(polyphenylene ether)s that have high glass transition temperatures. It would be a further advantage if the poly(polyphenylene ether)s had improved dielectric properties.

SUMMARY

The above-described and other deficiencies of the art are met by a poly(phenylene ether) copolymer comprising first repeating units comprising a $C_{1-6}$alkyl($C_{6-30}$cycloalkenyl) pendant group; second repeating units different from the first repeating units; a copolymer of Formula (3a); and optionally, at least one terminal functional group comprising (meth)acrylate, styrene, $—CH_2—(C_6H_4)—CH═CH_2$, allyl, cyanate ester, glycidyl ether, anhydride, aniline, maleimide, an activated ester, or a combination thereof, (3a)

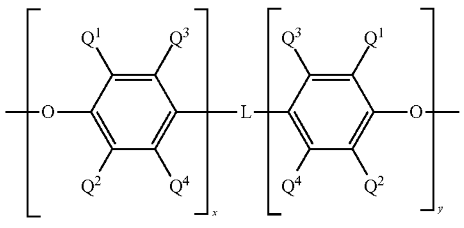

wherein, in the formula (3a), each occurrence of $Q^1$ and $Q^2$ independently comprise halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; each occurrence of $Q^3$ and $Q^4$ independently comprise hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; x and y are each independently 0-30; optionally, at least one of $Q^1$ to $Q^4$ is unsubstituted or substituted $C_{1-6}$alkyl($C_{6-30}$cycloalkenyl); L is of the formula

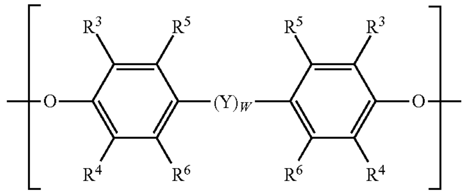

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; w is 0 or 1; and Y is

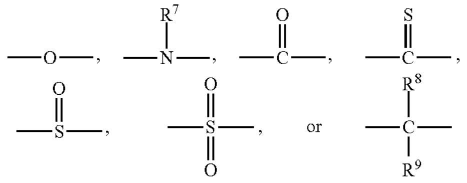

wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom; or L is of the formula

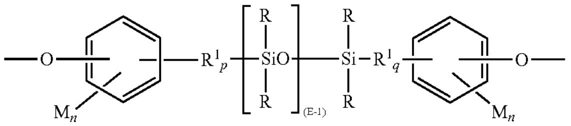

wherein E is 6-100, each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene; each p and q are independently 0 or 1, $R^1$ is a divalent $C_{2-8}$ aliphatic group, each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and each n is independently 0, 1, 2, 3, or 4.

In another aspect, a method of manufacture comprises making the above-described poly(phenylene ether) copolymer.

In another aspect, a curable composition comprises the above-described poly(phenylene ether) copolymer.

In another aspect, a thermoset composition comprises the above-described curable composition.

In another aspect, an article comprises the above-described thermoset composition.

The above-described and other features are exemplified by the following drawings, detailed description, examples, and claims.

DETAILED DESCRIPTION

The inventor hereof has discovered that the introduction of bulky, non-polar substituents as pendant groups on poly(phenylene ether) copolymers can increase the glass transition temperature of the poly(phenylene ether) copolymer, while maintaining or improving the dielectric properties of the poly(phenylene ether) copolymers. The bulky groups include $C_{1-6}$alkyl($C_{6-30}$cycloalkenyl) groups derived from a cycloaddition reaction of an alkene or alkyne with a conjugated diene. As used herein, the term $C_{1-6}$alkyl($C_{6-30}$cycloalkenyl) refers to an $C_{1-6}$-alkylene group with a $C_{6-30}$cycloalkenyl substituent, wherein the $C_{6-30}$cycloalkenyl substituent has at least one double bond. The $C_{6-30}$cycloalkenyl substituent can be a single ring, a fused ring system, or a bicyclic ring system.

The poly(phenylene ether) copolymer comprises: first repeating units comprising a $C_{1-6}$alkyl($C_{6-30}$cycloalkenyl) pendant group; second repeating units; a copolymer of Formula (3a); and optionally, at least one terminal functional group comprising (meth)acrylate, styrene, $—CH_2—(C_6H_4)—CH═CH_2$, allyl, cyanate ester, glycidyl ether, anhydride, aniline, maleimide, an activated ester, or a combination thereof. The individual components of the poly(phenylene ether) copolymers are described in detail below.

The poly(polyphenylene ether) copolymers include first repeating units of formula (1)

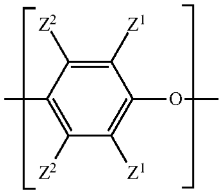

(1)

wherein each occurrence of $Z^1$ comprises halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms, and each occurrence of $Z^2$ comprises hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_2$-$C_{12}$ halohydrocarbyloxy wherein at least two carbon atoms separate the halogen and oxygen atoms; and at least one of $Z^1$ and $Z^2$ is an unsubstituted or substituted $C_{1-6}$alkyl($C_{6-30}$cycloalkenyl) group.

In an aspect in formula (1), each occurrence of $Z^1$ comprises halogen, unsubstituted or substituted $C_{1-6}$ primary or secondary hydrocarbyl, $C_{1-6}$ hydrocarbylthio, $C_{1-6}$ hydrocarbyloxy, $C_{1-3}$alkyl($C_{6-12}$cycloalkenyl), or $C_2$-$C_7$ halohydrocarbyloxy wherein at least two carbon atoms separate the halogen and oxygen atoms, and each occurrence of $Z^2$ comprises hydrogen, halogen, unsubstituted or substituted $C_{1-6}$ primary or secondary hydrocarbyl, $C_{1-6}$ hydrocarbylthio, $C_{1-6}$ hydrocarbyloxy, $C_{1-3}$alkyl($C_{6-12}$cycloalkenyl), or $C_2$-$C_7$ halohydrocarbyloxy wherein at least two carbon atoms separate the halogen and oxygen atoms; and at least one of $Z^1$ and $Z^2$ is an unsubstituted or substituted $C_{1-3}$alkyl($C_{6-12}$cycloalkenyl) group.

In a more preferred aspect, each occurrence of $Z^1$ comprises halogen, unsubstituted or substituted $C_{1-6}$ primary or secondary hydrocarbyl, $C_{1-6}$ hydrocarbylthio, $C_{1-6}$ hydrocarbyloxy, $C_1$alkyl($C_{6-12}$cycloalkenyl), or $C_2$-$C_7$ halohydrocarbyloxy wherein at least two carbon atoms separate the halogen and oxygen atoms, and each occurrence of $Z^2$ comprises hydrogen, halogen, or unsubstituted or substituted primary $C_{1-6}$ hydrocarbyl, $C_1$alkyl($C_{6-12}$cycloalkenyl); and at least one of $Z^1$ and $Z^2$ is an unsubstituted or substituted $C_1$alkyl($C_{6-12}$ cycloalkenyl) group.

The $C_{1-6}$alkyl($C_{6-30}$cycloalkenyl) pendant group of the first repeating unit can include a $—C_1$-$C_3$alkyl(bicyclo[2.2.1]heptene) group, a $—C_1$-$C_3$alkyl(bicyclo[2.2.1]heptadiene) group, a $—C_1$-$C_3$alkyl(cyclohexene) group, a $—C_1$-$C_3$alkyl(cyclohexadiene) group, or a $—C_1$-$C_3$alkyl($C_{6-30}$ cycloalkenyl) group, wherein the $C_{6-30}$ cycloalkenyl group is derived from a terpene, each optionally substituted with a $C_{1-12}$ primary or secondary hydrocarbyl, $C_{1-12}$ hydrocarbylthio, $C_{1-12}$ hydrocarbyloxy, or a combination thereof. In some aspects, the $C_{1-6}$alkyl($C_{6-30}$cycloalkenyl) pendant group of the first repeating unit includes a $—C_1$-$C_3$alkyl(bicyclo[2.2.1]heptene) group, a $—C_1$-$C_3$alkyl(cyclohexene) group, or a combination thereof. In some aspects, the $C_{1-6}$alkyl($C_{6-30}$cycloalkenyl) pendant group of the first repeating unit includes a $—C_1$-$C_3$alkyl(bicyclo[2.2.1]heptadiene) group, a $—C_1$-$C_3$alkyl(cyclohexadiene) group, or a combination thereof. In some aspects, the $C_{1-6}$alkyl($C_{6-30}$cycloalkenyl) pendant group of the first repeating unit includes a $—C_1$-$C_3$alkyl(bicyclo[2.2.1]heptene) group, a $—C_1$-$C_3$alkyl(cyclohexene) group, or a $—C_1$-$C_3$alkyl($C_{6-30}$ cycloalkenyl) group, wherein the $C_{6-30}$ cycloalkenyl group is derived from a terpene, or a combination thereof. In some aspects, the $C_{1-6}$alkyl($C_{6-30}$cycloalkenyl) pendant group of the first repeating unit includes a $—C_1$-$C_3$alkyl(bicyclo[2.2.1]heptadiene) group, a $—C_1$-$C_3$alkyl(cyclohexadiene) group, or a $—C_1$-$C_3$alkyl($C_{6-30}$ cycloalkenyl) group, wherein the $C_{6-30}$ cycloalkenyl group is derived from a terpene, or a combination thereof. In any of the foregoing, the pendant groups can be substituted with a $C_{1-12}$ primary or secondary hydrocarbyl, $C_{1-12}$ hydrocarbylthio, $C_{1-12}$ hydrocarbyloxy, or a combination thereof, preferably a $C_{1-6}$ primary or secondary hydrocarbyl, $C_{1-6}$ hydrocarbylthio, $C_{1-6}$ hydrocarbyloxy, or a combination thereof, more preferably a $C_{1-3}$ primary or secondary hydrocarbyl, $C_{1-3}$ hydrocarbylthio, $C_{1-3}$ hydrocarbyloxy, or a combination thereof.

In particular aspects, the first repeating units can be derived from 2-$CH_2$($C_{6-30}$cycloalkenyl)-6-methyl phenol, 2-$CH_2$($C_{6-30}$cycloalkenyl)-3,6-dimethyl phenol, 3-$CH_2$($C_{6-30}$cycloalkenyl)-2,6-dimethyl phenol, 2-phenyl-6-$CH_2$($C_{6-30}$cycloalkenyl) phenol, or a combination thereof; preferably 2-$CH_2$($C_{6-12}$cycloalkenyl)-6-methyl phenol, 2-$CH_2$($C_{6-12}$ cycloalkenyl)-3,6-dimethyl phenol, 3-$CH_2$($C_{6-12}$cycloalkenyl)-2,6-dimethyl phenol, 2-phenyl-6-$CH_2$($C_{6-12}$cycloalkenyl) phenol, or a combination thereof.

In addition to the first repeating units, the poly(polyphenylene ether) copolymer includes second repeating units of formula (2)

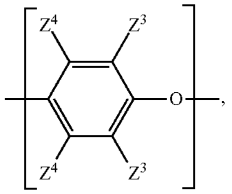, wherein $Z^3$ and $Z^4$ are each independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_2$-$C_{12}$ halohydrocarbyloxy wherein at least two carbon atoms separate the halogen and oxygen atoms.

In a preferred aspect in formula (2), $Z^3$ and $Z^4$ are each independently hydrogen, halogen, unsubstituted or substituted $C_{1-6}$ primary or secondary hydrocarbyl, $C_{1-6}$ hydrocarbylthio, $C_{1-6}$ hydrocarbyloxy, or $C_2$-$C_7$ halohydrocarbyloxy wherein at least two carbon atoms separate the halogen and oxygen atoms.

In a more preferred aspect of formula (2), $Z^3$ and $Z^4$ are each independently hydrogen, halogen, or unsubstituted or substituted primary $C_{1-6}$ hydrocarbyl. In some aspects, the second repeating units are derived from 2,6-dimethyl phenol, 2,3,6-trimethyl phenol, 2-phenyl-6-methyl phenol, 2-allyl-6-methyl phenol, or a combination thereof.

The poly(polyphenylene ether) copolymers include first repeating units and second repeating units. A molar ratio of first repeating units to second repeating units can range from 1:99 to 99:1, 10:90 to 90:10, 20:80 to 80:20, 25:75 to 75:25, 70:30 to 30:70, 60:40 to 40:60, or 50:50, each based on the total moles of first repeating units and second repeating units.

The poly(polyphenylene ether) copolymers can comprise units having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. Thus, $Z^1$ and $Z^2$ can each independently be hydrogen, cyclohexyl, phenyl, di-n-butylaminomethyl, morpholinomethyl or a combination thereof. In a preferred aspect, the poly(polyphenylene ether) copolymer comprises 2,6-dimethyl-1,4-phenylene ether units, 2,3,6-trimethyl-1,4-phenylene ether units, or a combination thereof. In some aspects, the poly(polyphenylene ether) copolymer comprises poly(2,6-dimethyl-1,4-phenylene ether) units.

In addition to the first repeating units of Formula (1) and the second repeating units of Formula (2), the poly(polyphenylene ether) copolymer includes a copolymer of Formula (3)

(3)

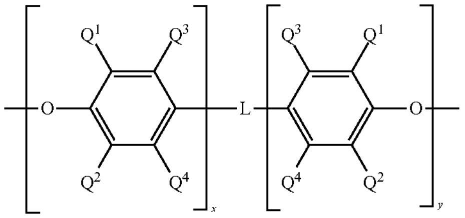

wherein each occurrence of $Q^1$ and $Q^2$ independently comprises halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; each occurrence of $Q^3$ and $Q^4$ independently comprises hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, $C_{1-6}$alkyl ($C_{6-30}$cycloalkenyl), or $C_{2-12}$ halohydrocarbyloxy wherein at least two carbon atoms separate the halogen and oxygen atoms; x and y have an average value, and are each independently 0-30, or 0-20, preferably 0-15, still more preferably 0-10, even more preferably 0-8, provided that the sum of x and y is at least 2, preferably at least 3, more preferably at least 4. In some aspects, at least one of $Q^1$, $Q^2$, $Q^3$, and $Q^4$ is an unsubstituted or substituted $C_{1-6}$alkyl($C_{6-30}$cycloalkenyl), preferably an unsubstituted or substituted $C_{1-3}$alkyl($C_{6-12}$cycloalkenyl), more preferably an unsubstituted or substituted $C_1$alkyl($C_{6-12}$cycloalkenyl).

The poly(polyphenylene ether) copolymer can include at least one terminal functional group. In some aspects, the poly(polyphenylene ether) copolymer can be monofunctional, having a terminal functional group at one terminus of the poly(polyphenylene ether) copolymer chain. The terminal functional group can be, for example, (meth)acrylate, styrene, $—CH_2—(C_6H_4)—CH{=}CH_2$, allyl, cyanate ester, glycidyl ether, anhydride, aniline, maleimide, or an activated ester. The poly(polyphenylene ether) copolymer can be bifunctional, having terminal functional groups at both termini of the poly(polyphenylene ether) copolymer chain. The terminal functional groups comprise (meth)acrylate, styrene, $—CH_2—(C_6H_4)—CH{=}CH_2$, allyl, cyanate ester, glycidyl ether, anhydride, aniline, maleimide, an activated ester, or a combination thereof.

Further in formula (3), L is of formula (4) or formula (5) as described below. L can be of formula (4)

(4)

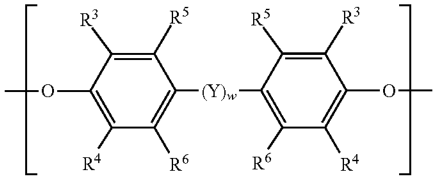

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; w is 0 or 1; and Y is

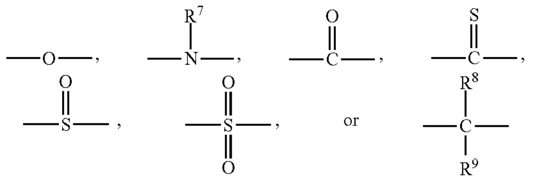
or wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom. In a preferred aspect in formula (4), each of $R^3$, $R^4$, $R^5$, and $R^6$ is independently hydrogen, halogen, unsubstituted or substituted $C_{1-6}$ primary or secondary hydrocarbyl, or $C_{1-6}$alkyl ($C_{6-30}$cycloalkenyl), and w is 0 or 1. In some aspects, when L is formula (4), at least one of $Q^1$, $Q^2$, $Q^3$, and $Q^4$ of formula (3), at least one of $R^3$, $R^4$, $R^5$, and $R^6$ of formula (4), or a combination thereof is an unsubstituted or substituted $C_{1-6}$alkyl($C_{6-30}$cycloalkenyl), preferably an unsubstituted or substituted $C_{1-3}$alkyl($C_{6-12}$cycloalkenyl), more preferably an unsubstituted or substituted $C_1$alkyl($C_{6-12}$cycloalkenyl).

In another aspect, L in formula (3) is of formula (5)

(5)

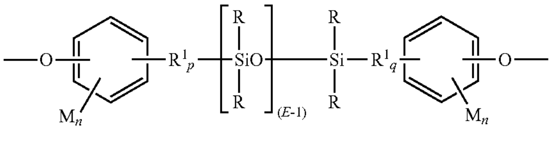

wherein E is 6-100, or 11-80, or 11-60; and each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene. The foregoing groups can be fully or partially halogenated with fluorine, chlorine, bromine, or iodine, or a combination thereof. Further in formula (5), each p and q are independently 0 or 1; $R^1$ is a divalent $C_{2-8}$ aliphatic group, and each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4. Preferably in formula 4, E is 5-60; each occurrence of R is independently $C_{1-6}$ alkyl, $C_{3-6}$ cycloalkyl, or $C_{6-14}$ aryl, more preferably methyl; p and q are each 1; $R^1$ is a divalent $C_{2-8}$ aliphatic group, M is halogen, cyano, $C_{1-4}$ alkyl, $C_{1-4}$ alkoxy, $C_{6-10}$ aryl, $C_{7-12}$ aralkyl, or $C_{7-12}$ alkylaryl, more preferably methyl or methoxy; and each n is independently 0, 1, or 2. In some aspects, when L is of formula (5), at least one of $Q^1$, $Q^2$, $Q^3$, and $Q^4$ of formula (3) is unsubstituted or substituted $C_{1-6}$alkyl($C_{6-30}$cycloalkenyl), preferably unsubstituted or substituted $C_{1-3}$alkyl($C_{6-12}$cycloalkenyl), more preferably unsubstituted or substituted $C_1$alkyl($C_{6-12}$cycloalkenyl).

In some aspects, L is of formula (4a)

(4a)

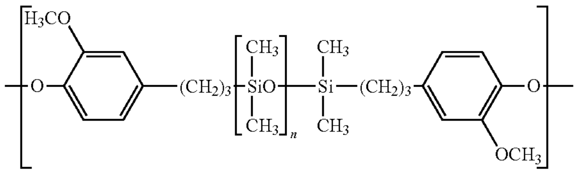

wherein n has an average value of 5-100, or 10-80, or 10-60. In some aspects, when L is of formula (4a), at least one of $Q^1$, $Q^2$, $Q^3$, and $Q^4$ of formula (3) is an unsubstituted or substituted $C_{1-6}$alkyl($C_{6-30}$cycloalkenyl), preferably an unsubstituted or substituted $C_{1-3}$alkyl($C_{6-12}$ cycloalkenyl), more preferably unsubstituted or substituted $C_1$alkyl ($C_{6-12}$cycloalkenyl).

In an aspect, the poly(polyphenylene ether) copolymer comprises a poly(polyphenylene ether) copolymer of formula (3a)

(3a)

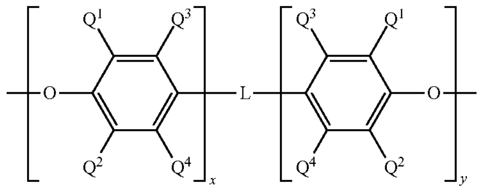

wherein $Q^1$, $Q^2$, $Q^3$, $Q^4$, L, x and y are as defined in formulas (3), (4), or (5). In an aspect, $Q^1$, $Q^2$, $Q^3$, or $Q^4$ is hydrogen, methyl, cyclohexyl, phenyl, di-n-butylaminomethyl, morpholinomethyl, or unsubstituted or substituted $C_{1-6}$alkyl ($C_{6-30}$cycloalkenyl). In some aspects, at least one of $Q^1$, $Q^2$, $Q^3$, and $Q^4$ is an unsubstituted or substituted $C_{1-6}$alkyl ($C_{6-30}$cycloalkenyl, preferably unsubstituted or substituted $C_{1-3}$alkyl($C_{6-12}$cycloalkenyl), more preferably unsubstituted or substituted $C_1$alkyl($C_{6-12}$cycloalkenyl).

The poly(polyphenylene ether) copolymer can include poly(polyphenylene ether) copolymer of formula (3b)

(3b)

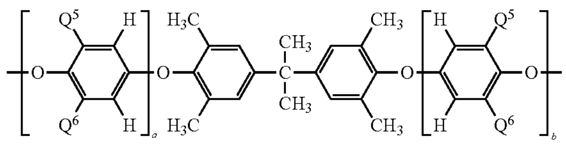

wherein each occurrence of $Q^5$ and $Q^6$ is independently methyl, cyclohexyl, phenyl, di-n-butylaminomethyl, morpholinomethyl, an unsubstituted or substituted $C_{1-6}$alkyl ($C_{6-30}$cycloalkenyl); and each occurrence of a and b is independently 0-20, with the proviso that the sum of a and b is at least 2. In some aspects, at least one of $Q^5$ and $Q^6$ is unsubstituted or substituted $C_{1-6}$alkyl($C_{6-30}$cycloalkenyl). In some aspects, in formula (3b), each occurrence of $Q^5$ and $Q^6$ is independently methyl, cyclohexyl, phenyl, di-n-butylaminomethyl, morpholinomethyl, $C_{1-6}$alkyl($C_{6-30}$cycloalkenyl); and at least one of $Q^5$ and $Q^6$ is unsubstituted or substituted $C_{1-6}$alkyl($C_{6-30}$cycloalkenyl); preferably unsubstituted or substituted $C_{1-3}$alkyl($C_{6-12}$cycloalkenyl), more preferably unsubstituted or substituted $C_1$alkyl($C_{6-12}$cycloalkenyl). Poly(polyphenylene ether) copolymers of this type wherein the $C_{1-6}$alkyl($C_{6-30}$cycloalkenyl) groups are absent are commercially available, for example NORYL SA9000, from SABIC.

The poly(polyphenylene ether) copolymer can further include an aryloxy-terminated polysiloxane block having repeating siloxane units of formula (6)

(6)

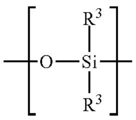

wherein each occurrence of $R^3$ is independently $C_{1-12}$ hydrocarbyl or $C_{1-12}$ halohydrocarbyl; and the polysiloxane block further comprises a terminal unit of formula (7)

(7)

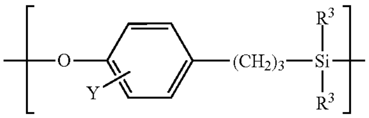

wherein Y is hydrogen, halogen, $C_{1-12}$ hydrocarbyl, or $C_{1-12}$ hydrocarbyloxy, and each occurrence of $R^3$ is independently hydrogen, $C_{1-12}$ hydrocarbyl, or $C_{1-12}$ halohydrocarbyl. Preferably Y is hydrogen, halogen, $C_{1-6}$ hydrocarbyl, or $C_{1-6}$ hydrocarbyloxy, and each occurrence of $R^3$ is independently hydrogen, $C_{1-6}$ hydrocarbyl, or $C_{1-6}$ halohydrocarbyl. Still more preferably Y is hydrogen, methyl, or methoxy, and each $R^3$ is methyl. In some aspects, the polysiloxane block comprises formula (8)

(8)

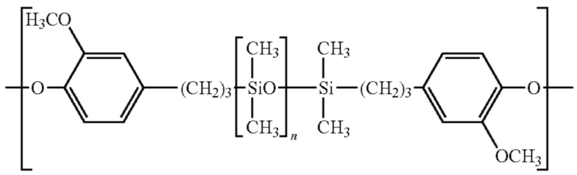

wherein n has an average value of 5-80 or 10-60. In an aspect the block copolymer comprises poly(2,6-dimethyl-1,4-phenylene ether) blocks, poly(2,6-dimethyl-1,4-phenylene ether-co-2,3,6-trimethyl-1,4-phenylene ether) blocks or a combination thereof; polysiloxane blocks of formula comprising, on average, 10-100 siloxane repeating units of formula (8); and terminal Z groups as described in formula (3), preferably (meth)acrylate groups. Manufacture of hydroxyl-terminated block copolymers are described, for example, in U.S. Pat. No. 8,722,837.

In some aspects, the poly(polyphenylene ether) copolymer is essentially free of incorporated diphenoquinone residues. In this context, "essentially free" means that the less than 1 wt % (wt %) of poly(polyphenylene ether) molecules comprise the residue of a diphenoquinone. As described in U.S. Pat. No. 3,306,874 to Hay, synthesis of poly(polyphenylene ether) by oxidative polymerization of monohydric phenol yields not only the desired poly(polyphenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(polyphenylene ether) (i.e., the diphenoquinone is incorporated into the poly(polyphenylene ether) structure) by heating the polymerization reaction mixture to yield a poly(polyphenylene ether) comprising terminal or internal diphenoquinone residues. For example, when a poly(polyphenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(polyphenylene ether) with terminal and internal residues of incorporated diphenoquinone. However, such reequilibration reduces the molecular weight of the poly(polyphenylene ether). Accordingly, when a higher molecular weight poly(polyphenylene ether) is desired, it can be desirable to separate the diphenoquinone from the poly(polyphenylene ether) rather than reequilibrating the diphenoquinone into the poly(polyphenylene ether) chains. Such a separation can be achieved, for example, by precipitation of the poly(polyphenylene ether) in a solvent or solvent mixture in which the poly(polyphenylene ether) is insoluble and the diphenoquinone is soluble. For example, when a poly(polyphenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1-4 volumes of methanol or a methanol/water mixture. Alternatively, the amount of diphenoquinone side-product generated during oxidative polymerization can be minimized (e.g., by initiating oxidative polymerization in the presence of less than 10 wt % of the monohydric phenol and adding at least 95 wt % of the monohydric phenol over the course of at least 50 minutes), and/or the reequilibration of the diphenoquinone into the poly(polyphenylene ether) chain can be minimized (e.g., by isolating the poly(polyphenylene ether) no more than 200 minutes after termination of oxidative polymerization). These approaches are described in International Patent Application Publication No. WO2009/104107 A1 of Delsman et al. In an alternative approach using the temperature-dependent solubility of diphenoquinone in toluene, a toluene solution containing diphenoquinone and poly(polyphenylene ether) can be adjusted to a temperature of 25° C., at which diphenoquinone is poorly soluble but the poly(polyphenylene ether) is soluble, and the insoluble diphenoquinone can be removed by solid-liquid separation (e.g., filtration).

The poly(polyphenylene ether) copolymers useful herein are lower molecular weight poly(polyphenylene ether) copolymers. The poly(polyphenylene ether) copolymer can have a number average molecular weight of 500-7,000 grams per mole (g/mol), and a weight average molecular weight of 500-15,000 g/mol, as determined by gel permeation chromatography using polystyrene standards. In some aspects, the number average molecular weight can be 750-4,000 g/mol, and the weight average molecular weight can be 1,500-9,000 g/mol, as determined by gel permeation chromatography using polystyrene standards.

In some aspects, the poly(polyphenylene ether) copolymer has an intrinsic viscosity of 0.03-1 deciliter per gram. For example, the poly(polyphenylene ether) can have an intrinsic viscosity of 0.25-1 deciliter per gram (dl/g), or 0.25-0.7 dl/g, or 0.35-0.55 dl/g, 0.35-0.50 dl/g, each measured at 25° C. in chloroform using an Ubbelohde viscometer. In other aspects, the poly(polyphenylene ether) copolymer can have an intrinsic viscosity of 0.03-0.13 dl/g, or 0.05-0.1 dl/g, or 0.1-0.15 dl/g, measured at 25° C. in chloroform using an Ubbelohde viscometer. The poly(phenylene ether)-polysiloxane block copolymer can have an intrinsic viscosity of at least 0.1 dl/g, as measured by Ubbelohde viscometer at 25° C. in chloroform. In some aspects, the intrinsic viscosity is 0.1-0.5 dl/g.

A method for preparing the poly(polyphenylene ether) copolymers can include a cycloaddition reaction followed by oxidative polymerization. The cycloaddition reaction includes reacting a cycloaddition monomer precursor comprising an alkene or an alkyne with a conjugated diene via a cycloaddition reaction to provide a cycloaddition monomer product, wherein the cycloaddition monomer precursor comprises a monohydric phenol, a dihydric phenol, a bisphenol, or a combination thereof. In some aspects, the alkene or an alkyne of the cycloaddition monomer precursor is terminal alkene or alkyne. The alkene or alkyne group can undergo cycloaddition reaction, such as a [4+2] cycloaddition (e.g., Diels-Alder reaction), with the conjugated diene to provide a monomer having an unsubstituted or substituted $C_{1-6}$alkyl($C_{6-30}$cycloalkenyl) group (i.e., the cycloaddition monomer product). After the cycloaddition, the cycloaddition monomer product can then undergo oxidative polymerization with an unsubstituted or substituted monohydric phenol, a dihydric phenol, a bisphenol, or a combination thereof to provide a hydroxyl-terminated poly(phenylene ether) copolymer having an unsubstituted or substituted $C_{1-6}$alkyl($C_{6-30}$cycloalkenyl) pendant group. The hydroxyl-terminated poly(phenylene ether) copolymer having an unsubstituted or substituted $C_{1-6}$alkyl($C_{6-30}$cycloalkenyl) pendant group can be reacted with a compound to provide a poly(phenylene ether) copolymer having at least one terminal functional group and an unsubstituted or substituted $C_{1-6}$alkyl($C_{6-30}$cycloalkenyl) pendant group.

A method for preparing the poly(phenylene ether) copolymers can include oxidative polymerization followed by cycloaddition. Oxidative polymerization of a polymerization precursor comprising an alkene or alkyne substituent with a monohydric phenol, a dihydric phenol, a bisphenol, or a combination thereof can provide a hydroxyl-terminated polymerized intermediate, wherein the polymerization precursor comprises a monohydric phenol, a dihydric phenol, a bisphenol, or a combination thereof. The alkene and/or alkyne groups of the polymerized intermediate can then undergo a cycloaddition reaction with a conjugated diene to provide a hydroxyl-terminated poly(phenylene ether) copolymer having an unsubstituted or substituted $C_{1-6}$alkyl($C_{6-30}$cycloalkenyl) pendant group. The alkene and/or the alkyne groups of the polymerized intermediate can be an unsubstituted or substituted $C_{3-6}$alkenyl group, a $C_5$-$C_6$cycloalkenyl group, a $C_{3-6}$alkynyl group, or a combination thereof. In some aspects, the alkene and/or the alkyne groups of the polymerized intermediate are terminal alkene and/or alkyne groups. At least one of the hydroxyl groups of the hydroxyl-terminated poly(phenylene ether) copolymer can be reacted with a compound to provide poly(phenylene ether) copolymer having at least one terminal functional group and an unsubstituted or substituted $C_{1-6}$alkyl($C_{6-30}$cycloalkenyl) pendant group.

The conjugated diene used in the cycloaddition reaction of the foregoing methods can be any conjugated s-cis diene known in the art or a diene capable of forming a conjugated s-cis diene (e.g., when exposed to heat, light, or acid). In some aspects, the diene is an unsubstituted or substituted 1,3-cyclopentadiene, an unsubstituted or substituted 1,3-cyclohexadiene, or an unsubstituted or substituted conjugated terpene. As used herein, the term "terpene" is a compound derived from isopentyl pyrophosphate or dimethylallyl pyrophosphate, encompassing hemiterpenes, monoterpenes, sesquiterpenes, diterpenes, sesterterpenes, triterpenes, tetraterpenes and polyterpenes. The term "conjugated terpene" as used herein refers to a compound that includes at least one conjugated diene, for example two double bonds joined by a single bond. In order to react in a cycloaddition reaction, the conjugated terpene should be capable of forming an s-cis configuration. Therefore, the conjugated terpene may be s-cis or s-trans, as long as it is capable forming a conjugated s-cis diene. Non-limiting examples of conjugated terpenes include isoprene, myrcene, α-ocimene, β-ocimene, α-farnesene, β-farnesene, β-springene, geranylfarnesene, neophytadiene, cis-phyta-1,3-diene, trans-phyta-1,3-diene, isodehydrosqualene, isosqualane, and the like.

The oxidative polymerization step of the foregoing methods can be carried out in the presence of a polymerization catalyst comprising a catalyst metal ion and a catalyst amine ligand, oxygen, and solvent. The polymerization catalyst can be prepared in situ by mixing the catalyst metal ion and the catalyst amine ligand. The solvent can be benzene, toluene, xylenes, mesitylene, chlorobenzene, dichlorobenzenes, chloroform, or combinations thereof. In some aspects, the solvent comprises toluene. The molecular oxygen can be provided, for example, in a purified form or as air. Derivatization of one or both of the terminal hydroxyl groups to provide terminal functional groups can be by methods known in the art.

The poly(phenylene ether) copolymers of the present disclosure can be reactive components in curable compositions. The curable composition an comprise a poly(phenylene ether) copolymer comprising at least one terminal functional group and a curing promoter.

In some aspects, the curable composition can further include an auxiliary curable resin, a curable unsaturated monomer composition, or both. The auxiliary curable resin can be a thermoset resin, for example, an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof.

Epoxy resins useful as auxiliary curable resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines. Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof coreactive curing agents. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The auxiliary curable resin can be a cyanate ester. Cyanate esters are compounds having a cyanate group (—O—C≡N) bonded to carbon via the oxygen atom, i.e. compounds with C—O—C≡N groups. Cyanate esters useful as auxiliary curable resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used.

The auxiliary curable resin can be a bismaleimide resin. Bismaleimide resins can be produced by reaction of a monomeric bismaleimide with a nucleophile such as a diamine, aminophenol, or amino benzhydrazide, or by reaction of a bismaleimide with diallyl bisphenol A. Non-limiting examples of bismaleimide resins can include 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl) pyridine, 2,6-bismaleimidopyridine, 1,3-bis(maleimidomethyl)cyclohexane, 1,3-bis(maleimidomethyl) benzene, 1,1-bis(4-maleimidophenyl)cyclohexane, 1,3-bis(dichloromaleimido)benzene, 4,4'-bis(citraconimido) diphenylmethane, 2,2-bis(4-maleimidophenyl)propane, 1-phenyl-1,1-bis(4-maleimidophenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-.alpha,alpha'-4,4'-dimethylenecyclohexanebismaleimide, N,N'-m-methaxylenebismaleimide, N,N'-4,4'-diphenylcyclohexanebismaleimide, and N,N'-methylenebis(3-chloro-p-phenylene)bismaleimide, as well as the maleimide resins disclosed in U.S. Pat. No. 3,562,223 to Bargain et al., and U.S. Pat. Nos. 4,211,860 and 4,211,861 to Stenzenberger. Bismaleimide resins can be prepared by methods known in the art, as described, for example, in U.S. Pat. No. 3,018,290 to Sauters et al. In some aspects, the bismaleimide resin is N,N'-4,4'-diphenylmethane bismaleimide.

The auxiliary curable resin can be a benzoxazine resin. As is well known, benzoxazine monomers are made from the reaction of three reactants, aldehydes, phenols, and primary amines with or without solvent. U.S. Pat. No. 5,543,516 to Ishida describes a solvent-free method of forming benzoxazine monomers. An article by Ning and Ishida in *Journal of Polymer Science, Chemistry Edition*, vol. 32, page 1121 (1994) describes a procedure using a solvent. The procedure using solvent is generally common to the literature of benzoxazine monomers.

The preferred phenolic compounds for forming benzoxazines include phenols and polyphenols. The use of polyphenols with two or more hydroxyl groups reactive in forming benzoxazines can result in branched or crosslinked products. The groups connecting the phenolic groups into a phenol can be branch points or connecting groups in the polybenzoxazine.

Exemplary phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydrooxynapthalene, 2-(diphenylphosphoryl) hydroquinone, 2,2'-biphenol, 4,4-biphenol, 4,4'-isopropylidenediphenol (bisphenol A), 4,4'-isopropylidenebis(2-methylphenol), 4,4'-isopropylidenebis (2-allylphenol), 4,4'(1,3-phenylenediisopropylidene) bisphenol (bisphenol M), 4,4'-isopropylidenebis(3-phenylphenol) 4,4'-(1,4-phenylenediisoproylidene) bisphenol (bisphenol P), 4,4'-ethylidenediphenol (bisphenol E), 4,4'oxydiphenol, 4,4'thiodiphenol, 4,4'-sufonyldiphenol, 4,4' sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), Bis(4-hydroxyphenyl)methane (Bisphenol-F), 4,4'-(cyclopentylidene)diphenol, 4,4'-(cyclohexylidene) diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, isopropylidenebis(2-allylphenol), 3,3-bis (4-hydroxyphenyl)isobenzofuran-1(3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl) ethane, tris(4-hydroxyphenyl)propane, tris(4-hydroxyphenyl)butane, tris(3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, and the like.

The aldehyde used to form the benzoxazine can be any aldehyde. In some aspects, the aldehyde has 1-10 carbon atoms. In some aspects, the aldehyde is formaldehyde. The amine used to form the benzoxazine can be an aromatic amine, an aliphatic amine, an alkyl substituted aromatic, or an aromatic substituted alkyl amine. The amine can also be a polyamine, although the use of polyamines will, under some circumstances, yield polyfunctional benzoxazine monomers. Polyfunctional benzoxazine monomers are more likely to result in branched and/or crosslinked polybenzoxazines than monofunctional benzoxazines, which would be anticipated to yield thermoplastic polybenzoxazines.

The amines for forming benzoxazines generally have 1-40 carbon atoms unless they include aromatic rings, and then they can have 6-40 carbon atoms. The amine of di- or polyfunctional can also serve as a branch point to connect one polybenzoxazine to another. Thermal polymerization has been the preferred method for polymerizing benzoxazine monomers. The temperature to induce thermal polymerization is typically varied from 150-300° C. The polymerization is typically done in bulk, but could be done from solution or otherwise. Catalysts, such as carboxylic acids, have been known to slightly lower the polymerization temperature or accelerate the polymerization rate at the same temperature.

The auxiliary curable resin can be a vinylbenzyl ether resin. Vinyl benzyl ether resins can be readily prepared from condensation of a phenol with a vinyl benzyl halide, such as vinylbenzyl chloride to produce a vinylbenzyl ether. Bisphenol-A and trisphenols and polyphenols are generally used to produce poly(vinylbenzyl ethers) which can be used to produce crosslinked thermosetting resins. Vinyl benzyl ethers useful in the present composition can include those vinylbenzyl ethers produced from reaction of vinylbenzyl chloride or vinylbenzyl bromide with resorcinol, catechol, hydroquinone, 2,6-dihydroxy naphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4'oxydiphenol, 4,4'thiodiphenol, 4,4'thiobis(2,6-dimethylphenol), 4,4'-sufonyldiphenol, 4,4'-sufonylbis(2,6-dimethylphenol) 4,4' sulfonyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(ortho-cresol), dicyclopentadienyl bisphenol, and the like.

The auxiliary curable resin can be an arylcyclobutene resin. Arylcyclobutenes include those derived from compounds of the general structure

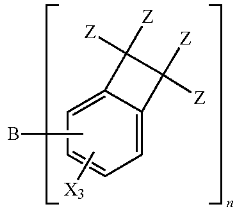

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_{6-20}$ phenolic compounds); each occurrence of X is independently hydroxy or $C_{1-24}$ hydrocarbyl (including linear and branched alkyl and cycloalkyl); and each occurrence of Z is independently hydrogen, halogen, or $C_{1-12}$ hydrocarbyl; and n is 1-1000, or 1-8, or 2, 3, or 4. Other useful arylcyclobutenes and methods of arylcyclobutene synthesis can be found in U.S. Pat. Nos. 4,743,399, 4,540,763, 4,642,329, 4,661,193, and 4,724,260 to Kirchhoff et al., and U.S. Pat. No. 5,391,650 to Brennan et al.

The auxiliary curable resin can be a perfluorovinyl ether resin. Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether)s. Non-limiting examples of phenols useful in their synthesis include resorcinol, catechol, hydroquinone, 2,6-dihydroxy naphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4'oxydiphenol, 4,4'thiodiphenol, 4,4'thiobis(2,6-dimethylphenol), 4,4'-sufonyldiphenol, 4,4'-sufonylbis(2,6-dimethylphenol) 4,4' sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol), dicyclopentadienyl bisphenol, and the like.

The curable composition can include an oligomer or polymer with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (a copolymer of isobutylene and isoprene, IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (namely, ethylene-α-olefin copolymers obtained by copolymerizing ethylene, an α-olefin, and a diene, such as ethylene-propylene-diene terpolymer (EPDM) and ethylene-butene-diene terpolymer (EBDM). In some aspects, an EBDM is used. Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber. Further examples include various liquid rubbers, for example various types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene (for example, as sold by ELF ATOCHEM).

Polybutadiene resins, generally polybutadienes containing high levels of 1,2 addition can be desirable in curable compositions. Examples include the functionalized polybutadienes and poly(butadiene-styrene) random copolymers sold by RICON RESINS, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17. Also included are polybutadienes that can be used to improve adhesion including RICOBOND 1031, RICOBOND 1731, RICOBOND 2031, RICACRYL 3500, RICOBOND 1756, RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 0 1731 HS, and RICOBOND 1756HS. Further butadiene resins include poly(butadiene-isoprene) block and random copolymers, such as those with molecular weights from 3,000-50,000 grams per mole and polybutadiene homopolymers having molecular weights from 3,000-50,000 grams per mole. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether (meth)acrylate resin, polyalcohol (meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resin.

In some aspects, the curable composition comprises a curable unsaturated monomer composition. The curable unsaturated monomer composition can include, for example, a monofunctional styrenic compound (e.g., styrene), a monofunctional (meth)acrylic compound, a polyfunctional allylic compound, a polyfunctional (meth)acrylate, a polyfunctional (meth)acrylamide, a polyfunctional styrenic compound, or a combination thereof. For example, in some aspects, the curable unsaturated monomer composition can be an alkene-containing monomer or an alkyne-containing monomer. Exemplary alkene- and alkyne-containing monomers include those described in U.S. Pat. No. 6,627,704 to Yeager et al. Non-limiting examples of alkene-containing monomers include acrylate, methacrylate, and vinyl ester functionalized materials capable of undergoing free radical polymerization. Of particular use are acrylate and methacrylate materials. They can be monomers and/or oligomers such as (meth)acrylates, (meth)acrylamides, N-vinylpyrrolidone and vinylazlactones as disclosed in U.S. Pat. No. 4,304,705 of Heilman et al. Such monomers include mono-, di-, and polyacrylates and methacrylates, such as methyl acrylate, methyl methacrylate, ethyl acrylate, isopropyl methacrylate, isooctyl acrylate, isobornyl acrylate, isobornyl methacrylate, acrylic acid, n-hexyl acrylate, tetrahydrofurfuryl acrylate, N-vinylcaprolactam, N-vinylpyrrolidone, acrylonitrile, stearyl acrylate, allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 2-phenoxyethyl acrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p- ethoxyphenyldimethylmethane, 2,2-bis[1-(3-acryloxy-2-hydroxy)] propoxyphenylpropane, tris(hydroxyethyl)isocyanurate trimethacrylate; the bis-acrylates and bis-methacrylates of polyethylene glycols of molecular weight average 200-500 grams per mole, bis-acrylates and bis-methacrylates of polybutadienes of molecular weight average 1000-10,000 grams per mole, copolymerizable mixtures of acrylated monomers such as those disclosed in U.S. Pat. No. 4,652,274 to Boettcher et al. and acrylated oligomers such as those disclosed in U.S. Pat. No. 4,642,126 to Zador et al.

It can be desirable to crosslink the alkene- or alkyne-containing monomer. Particularly useful as crosslinker compounds are acrylates such as allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1, 3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldi-methylmethane, 2,2-bis[1-(3-acryloxy-2-hydroxy)]propoxyphenylpropane, tris(hydroxyethyl)isocyanurate trimethacrylate; and the bis-acrylates and bis-methacrylates of polyethylene glycols of average molecular weight 200-500 grams per mole.

Also included are allylic resins and styrenic resins for example triallylisocyanurate and trimethallylisocyanurate, trimethallylcyanurate, triallylcyanurate, divinyl benzene and dibromostyrene and others described in U.S. Pat. No. 6,627,704 to Yeager et al.

A curing promoter can be selected based on the functional group present on the poly(phenylene ether) copolymer and, when present, the auxiliary curable resin or the curable unsaturated monomer composition. For example, the curing promoter can comprise an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination thereof.

In addition to the poly(phenylene ether) copolymer, the curing promoter, and, when present, the auxiliary resin or unsaturated monomer composition, the curable composition can, optionally, comprise a solvent. The solvent can have an atmospheric boiling point of 50 to 250° C. A boiling point in this range facilitates removal of solvent from the curable composition while minimizing or eliminating the effects of bubbling during solvent removal.

The solvent can be, for example, a $C_{3-8}$ ketone, a $C_{3-8}$N,N-dialkylamide, a $C_{4-16}$ dialkyl ether, a $C_{6-12}$ aromatic hydrocarbon, a $C_{1-3}$ chlorinated hydrocarbon, a $C_{3-6}$ alkyl alkanoate, a $C_{2-6}$ alkyl cyanide, or a combination thereof. The carbon number ranges refer to the total number of carbon atoms in the solvent molecule. For example, a $C_{4-16}$ dialkyl ether has 4 to 16 total carbon atoms, and the two alkyl groups can be the same or different. As other examples, the 3-8 carbon atoms in the "N,N-dialkylamide" include the carbon atom in the amide group, and the 2-6 carbons in the "$C_{2-6}$ alkyl cyanides" include the carbon atom in the cyanide group. Specific ketone solvents include, for example, acetone, methyl ethyl ketone, methyl isobutyl ketone, or a combination thereof. Specific $C_{4-8}$ N,N-dialkylamide solvents include, for example, dimethylformamide, dimethylacetamide, N-methyl-2-pyrrolidone, or a combination thereof. Specific dialkyl ether solvents include, for example, tetrahydrofuran, ethylene glycol monomethylether, dioxane, or a combination thereof. In some aspects, the $C_{4-16}$ dialkyl ethers include cyclic ethers such as tetrahydrofuran and dioxane. In some aspects, the $C_{4-16}$ dialkyl ethers are noncyclic. The dialkyl ether can, optionally, further include one or more ether oxygen atoms within the alkyl groups and one or more hydroxy group substituents on the alkyl groups. The aromatic hydrocarbon solvent can comprise an ethylenically unsaturated solvent. Exemplary aromatic hydrocarbon solvents include, for example, benzene, toluene, xylenes, styrene, divinylbenzenes, or a combination thereof. The aromatic hydrocarbon solvent is preferably non-halogenated. As used herein, the term "non-halogenated" means that the solvent does not include any fluorine, chlorine, bromine, or iodine atoms. Specific $C_{3-6}$ alkyl alkanoates include, for example, methyl acetate, ethyl acetate, methyl propionate, ethyl propionate, or a combination thereof. Specific $C_{2-6}$ alkyl cyanides include, for example, acetonitrile, propionitrile, butyronitrile, or a combination thereof. In some aspects, the solvent is acetone. In some aspects, the solvent is methyl ethyl ketone. In some aspects, the solvent is methyl isobutyl ketone. In some aspects, the solvent is N-methyl-2-pyrrolidone. In some aspects, the solvent is dimethylformamide. In some aspects, the solvent is ethylene glycol monomethyl ether.

When a solvent is utilized, the curable composition can comprise 2-100 parts by weight of the solvent, based on 100 parts by weight total of the poly(phenylene ether) copolymer, the curing promoter, and the auxiliary resin or unsaturated monomer composition (when present). For example, the solvent amount can be 5-80 parts by weight, or 10-60 parts by weight, or 20-40 parts by weight, based on 100 parts by weight total of the poly(phenylene ether) copolymer, the curing promoter, and any auxiliary resin. The solvent can be chosen, in part, to adjust the viscosity of the curable composition. Thus, the solvent amount can depend on variables including the type and amount of poly(phenylene ether) copolymer, the type and amount of curing promoter, the type and amount of auxiliary resin, and the processing temperature used for any subsequent processing of the curable composition, for example, impregnation of a reinforcing structure with the curable composition for the preparation of a composite.

The curable composition can further comprise an inorganic filler. Exemplary inorganic fillers include, for example, alumina, silica (including fused silica and crystalline silica), boron nitride (including spherical boron nitride), aluminum nitride, silicon nitride, magnesia, magnesium silicate, glass fibers, glass mat, or a combination thereof. Exemplary glass fibers include those based on E, A, C, ECR, R, S, D, and NE glasses, as well as quartz. The glass fiber can have a diameter of 2-30 micrometers (μm), or 5-25 μm, or 5-15 μm. The length of the glass fibers before compounding can be 2-7 millimeters (mm), or 1.5-5 mm. Alternatively, longer glass fibers or continuous glass fibers can be used. The glass fiber can, optionally, include an adhesion promoter to improve its compatibility with the poly(phenylene ether) copolymer, the auxiliary epoxy resin, or both. Adhesion promoters include chromium complexes, silanes, titanates, zircon-aluminates, propylene maleic anhydride copolymers, reactive cellulose esters, and the like. Exemplary glass fiber is commercially available from suppliers including, for example, OWENS CORNING, NIPPON ELECTRIC GLASS, PPG, and JOHNS MANVILLE.

When an inorganic filler is utilized, the curable composition can comprise 2-900 parts by weight of inorganic filler, based on 100 parts by weight total of the poly(phenylene ether) copolymer, the curing promoter, and the auxiliary curable resin. In some aspects, the curable composition comprises 100-900 parts by weight inorganic filler, or 200-800 parts by weight inorganic filler, or 300-700 parts by weight inorganic filler, based on 100 parts by weight total poly(phenylene ether) copolymer, curing promoter, and auxiliary curable resin. In some aspects, the curable composition comprises less than 50 parts by weight inorganic filler, or less than 30 parts by weight inorganic filler, or less than 10 parts by weight inorganic filler, based of 100 parts by weight total of the poly(phenylene ether) copolymer, the curing promoter, and the auxiliary curable resin. In some aspects, the curable composition can be substantially free of inorganic filler (that is, the composition can comprises less than 0.1 wt % of added inorganic filler, based 100 parts by weight of the poly(phenylene ether) copolymer, the curing promoter, and the auxiliary curable resin).

The curable composition also can include a coupling agent, for example a silane coupling agent. Exemplary silane coupling agents can include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxy silylpropyl) tetrasulfide, bis(2-trimethoxysilylethyl) tetrasulfide, 3-mercaptopropyltrimethoxysilane, 3-mercaptopropyltriethoxy silane, 2-mercaptoethyltrimethoxysilane, 2-mercaptoethyltriethoxysilane, 3-mercaptopropyldimethoxymethylsilane, and the like, and combinations thereof.

The curable composition can, optionally, further comprise one or more additives. Exemplary additives include, for example, solvents, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, or a combination thereof.

The curable composition can comprise the poly(phenylene ether) copolymer described herein, a curing promoter, a solvent, and an auxiliary resin, a curable unsaturated monomer compositions, or a combination thereof. In some aspects, an auxiliary curable resin and/or a curable unsaturated monomer composition is absent.

The curable composition can comprise 1-99 wt % of the auxiliary curable resin, a curable unsaturated monomer composition, or both and 1-99 wt % of the poly(phenylene ether) copolymer, each based on the total weight of the curable composition. For example, the composition can include 20-99 wt % of the auxiliary curable resin, a curable unsaturated monomer composition, or both and 1-80 wt % of the poly(phenylene ether) copolymer.

The curable composition can comprise a poly(phenylene ether) having at least one terminal group comprising a cyanate ester, a glycidyl ether, an anhydride, an aniline, a maleimide, an activated ester, or a combination thereof; an auxiliary resin comprising cyanate ester resin, epoxy resin, bismaleimide resin, or a combination thereof; a curing promoter; polymerization catalyst, flame retardant, filler (preferably silica), silane coupling agent, antioxidants and other additives (heat stabilizers, antistatic agent, UV absorbent, lubricant, colorant).

While the curable composition of the present invention will over time provide a thermoset at ambient conditions, optimum results are achieved by the application of heating and/or the use of a free radical curing agent. The curable composition can be cured by an energetic free radical generator such as ultraviolet light, electron beam or gamma radiation, or by one or more chemical free radical generators such as azo compounds and peroxides. The composition can be ultraviolet light-cured if one or more photoinitiators is added prior to curing. There are no special restrictions on the nature of the useful photoinitiators provided they generate radicals by the absorption of energy.

A thermoset composition (i.e., cured composition) can be obtained by heating the curable composition defined herein for a time and temperature sufficient to evaporate the solvent and effect curing. For example, the curable composition can be heated to a temperature of 50-250° C. to cure the composition and provide the thermoset composition. In curing, a cross-linked, three-dimensional polymer network is formed. For certain thermoset resins, for example (meth) acrylate resins, curing can also take place by irradiation with actinic radiation at a sufficient wavelength and time. In some aspects, curing the composition can include injecting the curable composition into a mold, and curing the injected composition at 150-250° C. in the mold.

The thermoset composition can have one or more desirable properties. For example, the thermoset composition can have a glass transition temperature of greater than or equal to 180° C., preferably greater than or equal to 190° C., more preferably greater than or equal to 200° C., as determined according to differential scanning calorimetry as per ASTM D3418 with a 20° C./min heating rate.

The thermoset composition can have low dielectric properties. Dielectric properties can be measured according to IPC-TM-650-2.5.5.9 Permittivity and Loss Tangent, Parallel Plate, 1 MHz to 1.5 GHz.

The thermoset composition can have low moisture absorption. Moisture absorption can be measured according to at 85% relative humidity, 85° C., 7 days. The thermoset composition can exhibit a water absorption of less than or equal to 5 wt %, less than or equal to 4 wt %, less than or equal to 3 wt %, less than or equal to 2 wt %, or less than or equal to 1 wt % measured after immersion in deionized water at 25° C. for 24 hours.

The thermoset composition can exhibit good impact strength. In some aspects, the composition exhibits an unnotched Izod impact strength of at least 400 joules per meter, specifically 400-600 joules per meter, more specifically 450-550 joules per meter, and still more specifically 480-520 joules per meter, as measured at 23° C. with a hammer energy of 2 foot-pounds in accordance with ASTM D 4812-06.

The thermoset composition described herein can also be particularly well suited for use in forming various articles. For example, useful articles can be in the form of a composite, a foam, a fiber, a layer, a coating, an encapsulant, an adhesive, a sealant, a molded component, a prepreg, a casing, a laminate, a metal clad laminate, an electronic composite, a structural composite, or a combination thereof. In some aspects, the article can be in the form of a composite that can be used in a variety of applications, for example printed circuit boards.

In some aspects, the article is a copper-clad laminate made from a curable composition comprising a poly(phenylene ether) having at least one terminal function group comprising (meth)acrylate, styrene, $—CH_2—(C_6H_4)—CH{=}CH_2$, allyl, or a combination thereof; an auxiliary curable resin comprising vinyl groups; a radical initiator, flame retardant, filler (preferably silica), silane coupling agent, antioxidants and other additives (heat stabilizers, antistatic agent, UV absorbent, lubricant, colorant).

This disclosure further encompasses the following aspects.

Aspect 1: A poly(phenylene ether) copolymer comprising first repeating units comprising a $C_{1-6}$alkyl($C_{6-30}$cycloalkenyl) pendant group; second repeating units different from the first repeating units; a copolymer of Formula (3); and optionally, at least one terminal functional group comprising (meth)acrylate, styrene, $—CH_2—(C_6H_4)—CH{=}CH_2$, allyl, cyanate ester, glycidyl ether, anhydride, aniline, maleimide, an activated ester, or a combination thereof, (3a)

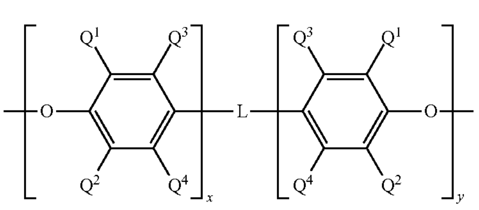

wherein, in the formula (3), each occurrence of $Q^1$ and $Q^2$ independently comprise halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; each occurrence of $Q^3$ and $Q^4$ independently comprise hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; x and y are each independently 0-30; optionally, at least one of $Q^1$ to $Q^4$ is unsubstituted or substituted $C_{1-6}$alkyl($C_{6-30}$cycloalkenyl); L is of the formula

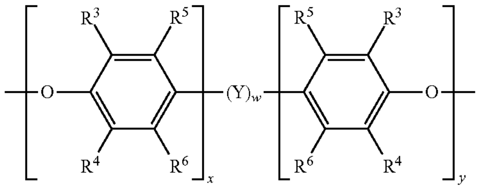

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms; w is 0 or 1; and Y is

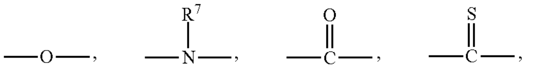

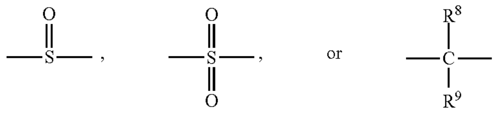

wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom; or L is of the formula

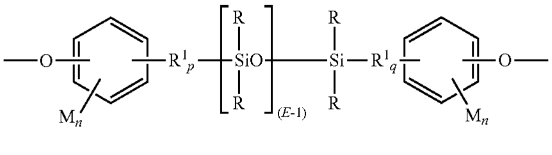

wherein E is 6-100, each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene; each p and q are independently 0 or 1, $R^1$ is a divalent $C_{2-8}$ aliphatic group, each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and each n is independently 0, 1, 2, 3, or 4.

Aspect 2: The poly(phenylene ether) copolymer of Aspect 1, wherein:

the first repeating units have the structure

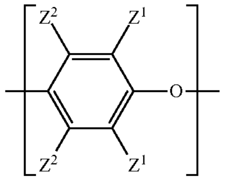

wherein each occurrence of $Z^1$ comprises halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl ($C_{6-30}$cycloalkenyl), or $C_{2-12}$ halohydrocarbyloxy wherein at least two carbon atoms separate the halogen and oxygen atoms, and each occurrence of $Z^2$ comprises hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms, and at least one of $Z^1$ and $Z^2$ is an unsubstituted or substituted $C_{1-6}$alkyl($C_{6-30}$cycloalkenyl); the second repeating units have the structure

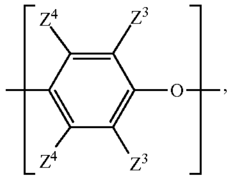

wherein each occurrence of $Z^3$ independently comprises halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, and each occurrence of $Z^4$ independently comprises hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

Aspect 3: The poly(phenylene ether) copolymer of Aspect 1 or Aspect 2, wherein the poly(phenylene ether) copolymer comprises a copolymer of Formula (3b)

(3b)

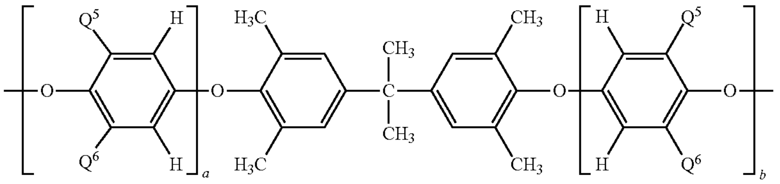

wherein each occurrence of $Q^5$ and $Q^6$ is independently methyl, cyclohexyl, phenyl, di-n-butylaminomethyl, morpholinomethyl, or an unsubstituted or substituted $C_{1-6}$alkyl ($C_{6-30}$cycloalkenyl); and each occurrence of a and b is independently 0-20, with the proviso that the sum of a and b is at least 2.

Aspect 4: The poly(phenylene ether) copolymer of any one of the preceding aspects, wherein the second repeating units are derived from 2,6-dimethyl phenol, 2,3,6-trimethyl phenol, 2-phenyl-6-methyl phenol, 2-allyl-6-methyl phenol, or a combination thereof.

Aspect 5: The poly(phenylene ether) copolymer of any one of the preceding aspects comprising a polysiloxane block comprising: repeating units of the formula

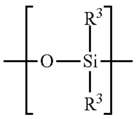

wherein each occurrence of $R^3$ is independently $C_{1-12}$ hydrocarbyl or $C_{1-12}$ halohydrocarbyl; and a terminal unit of the formula

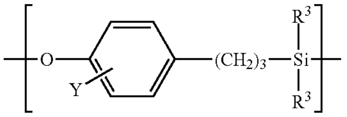

wherein: Y is hydrogen, halogen, $C_{1-12}$ hydrocarbyl, or $C_{1-12}$ hydrocarbyloxy, and each occurrence of $R^3$ is independently hydrogen, $C_{1-12}$ hydrocarbyl, or $C_{1-12}$ halohydrocarbyl, preferably wherein Y is hydrogen, halogen, $C_{1-6}$ hydrocarbyl, or $C_{1-6}$ hydrocarbyloxy, and each occurrence of $R^3$ is independently hydrogen, $C_{1-6}$ hydrocarbyl, or $C_{1-6}$ halohydrocarbyl, more preferably wherein Y is hydrogen, methyl, or methoxy, and each $R^3$ is methyl.

Aspect 6: The poly(phenylene ether) copolymer of any one of the preceding aspects comprising a polysiloxane block comprising the structure

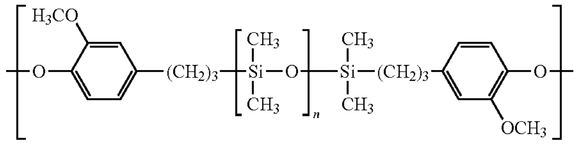

wherein n has an average value of 5-100, or 10-80 or 10-60.

Aspect 7: The poly(phenylene ether) copolymer of any one of the preceding aspects, wherein the $C_{1-6}$alkyl($C_{6-30}$cycloalkenyl) pendant group of the first repeating unit is a —$C_1$-$C_3$alkyl(bicyclo[2.2.1]heptene) group, a —$C_1$-$C_3$alkyl (bicyclo[2.2.1]heptadiene) group, a —$C_1$-$C_3$alkyl(cyclohexene) group, a —$C_1$-$C_3$alkyl(cyclohexadiene) group, or a —$C_1$-$C_3$alkyl($C_{6-30}$ cycloalkenyl) group, wherein the $C_{6-30}$ cycloalkenyl group is derived from a terpene, each optionally substituted with a $C_{1-12}$ primary or secondary hydrocarbyl, $C_{1-12}$ hydrocarbylthio, $C_{1-12}$ hydrocarbyloxy, or a combination thereof.

Aspect 8: The poly(phenylene ether) copolymer of any one of the preceding aspects, wherein the first repeating units are derived from 2-$CH_2$($C_{6-30}$cycloalkenyl)-6-methyl phenol, 2-$CH_2$($C_{6-30}$cycloalkenyl)-3,6-dimethyl phenol, 3-$CH_2$($C_{6-30}$cycloalkenyl)-2,6-dimethyl phenol, 2-phenyl-6-$CH_2$($C_{6-30}$cycloalkenyl) phenol, or a combination thereof.

Aspect 9: A method of preparing the poly(phenylene ether) copolymer of any one of Aspects 1-8, comprising: reacting a cycloaddition monomer precursor comprising an alkene or an alkyne with a conjugated diene via a cycloaddition reaction to provide a cycloaddition monomer product, wherein the cycloaddition monomer precursor comprises a monohydric phenol, a dihydric phenol, a bisphenol, or a combination thereof; oxidatively polymerizing the cycloaddition monomer product with an unsubstituted or substituted monohydric phenol, a dihydric phenol, a bisphenol, or a combination thereof to provide a hydroxyl-terminated poly (phenylene ether) copolymer having an unsubstituted or substituted $C_{1-6}$alkyl($C_{6-30}$cycloalkenyl) pendant group; and optionally, reacting at least one hydroxyl terminal group of the hydroxyl-terminated poly(phenylene ether) copolymer having an unsubstituted or substituted $C_{1-6}$alkyl($C_{6-30}$cycloalkenyl) pendant group with a compound to provide poly(phenylene ether) copolymer having an unsubstituted or substituted $C_{1-6}$alkyl($C_{6-30}$cycloalkenyl) pendant group and at least one terminal functional group.

Aspect 10: A method of preparing the poly(phenylene ether) copolymer of any one of Aspects 1-8, comprising oxidatively polymerizing a polymerization precursor comprising an alkene or alkyne with a monohydric phenol, a dihydric phenol, a bisphenol, or a combination thereof, to provide a hydroxyl-terminated polymerized intermediate, wherein the polymerization precursor comprises a monohydric phenol, a dihydric phenol, a bisphenol, or a combination thereof; reacting the hydroxyl-terminated polymerized intermediate with a conjugated diene via a cycloaddition reaction to provide a hydroxyl-terminated poly(phenylene ether) copolymer having an unsubstituted or substituted $C_{1-6}$alkyl ($C_{6-30}$cycloalkenyl) pendant group; and optionally, reacting at least one hydroxyl terminal group of the hydroxyl-terminated polymerized intermediate with a compound to provide a poly(phenylene ether) copolymer having an unsubstituted or substituted $C_{1-6}$alkyl($C_{6-30}$cycloalkenyl) pendant group and at least one terminal functional group.

Aspect 11: A curable composition comprising the poly (phenylene ether) copolymer of any one of Aspects 1 to 8;

and a curing promoter comprising an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination thereof.

Aspect 12: The curable composition of Aspect 11, further comprising an auxiliary curable resin comprising an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof; a curable unsaturated monomer comprising a monofunctional styrenic compound, a monofunctional (meth)acrylic compound, a polyfunctional allylic compound, a polyfunctional (meth) acrylate, a polyfunctional (meth)acrylamide, a polyfunctional styrenic compound, or a combination thereof; or a combination thereof.

Aspect 13: A thermoset composition comprising the curable composition of Aspect 11 or Aspect 12, wherein the thermoset composition has a glass transition temperature of greater than or equal to 180° C., preferably greater than or equal to 190° C., more preferably greater than or equal to 200° C., as determined according to differential scanning calorimetry as per ASTM D3418 with a 20° C./min heating rate.

Aspect 14: An article comprising the thermoset composition of Aspect 13, wherein the article is a composite, a foam, a fiber, a layer, a coating, an encapsulant, an adhesive, a sealant, a molded component, a prepreg, a casing, a laminate, a metal clad laminate, an electronic composite, a structural composite, or a combination thereof.

Aspect 15: A method for the manufacture of a thermoset composition, the method comprising curing the curable composition of Aspect 11 or Aspect 12, preferably at a temperature of 50 to 250° C.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($—NO_2$), a cyano (—CN), a $C_{1-6}$ alkyl sulfonyl ($—S({=}O)_2$-alkyl), a $C_{6-12}$ aryl sulfonyl ($—S({=}O)_2$-aryl)a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $-CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A poly(phenylene ether) copolymer comprising first repeating units comprising a $C_{1-6}$alkyl($C_{6-30}$cycloalkenyl) pendant group, wherein the $C_{1-6}$alkyl ($C_{6-30}$cycloalkenyl) pendant group of the first repeating unit is a $-C_1$-$C_3$alkyl(bicyclo[2.2.1]heptene) group, a $-C_1$-$C_3$alkyl(bicyclo[2.2.1]heptadiene) group, a $-C_1$-$C_3$alkyl(cyclohexene) group, a $-C_1$-$C_3$alkyl(cyclohexadiene) group, or a $-C_1$-$C_3$alkyl($C_{6-30}$ cycloalkenyl) group;

second repeating units different from the first repeating units;

a copolymer of Formula (3); and at least one terminal functional group comprising (meth) acrylate, styrene, $-CH_2-(C_6H_4)-CH{=}CH_2$, allyl, cyanate ester, glycidyl ether, anhydride, aniline, maleimide, an activated ester, or a combination thereof, (3)

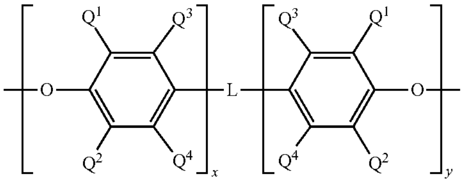

wherein in Formula (3):

each occurrence of $Q^1$ and $Q^2$ independently comprise halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen atom and oxygen atom;

each occurrence of $Q^3$ and $Q^4$ independently comprise hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms;

x and y are each independently 0-30;

optionally, at least one of $Q^1$ to $Q^4$ is unsubstituted or substituted $C_{1-6}$alkyl($C_{6-30}$cycloalkenyl);

L is of the formula

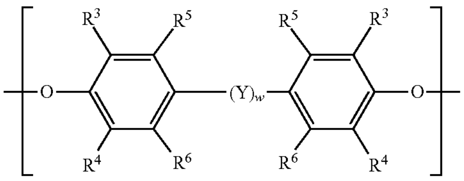

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms;

w is 0 or 1; and

Y is

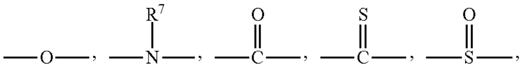

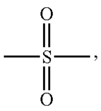 or 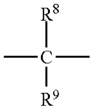

wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom;

or

L is of the formula

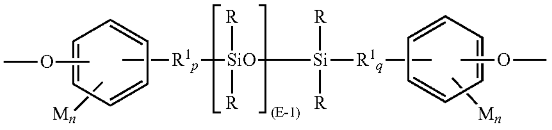

wherein

E is 6-100, each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene; each p and q are independently 0 or 1, $R^1$ is a divalent $C_{2-8}$ aliphatic group, each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and each n is independently 0, 1, 2, 3, or 4.

2. The poly(phenylene ether) copolymer of claim 1, wherein:

the first repeating units have the structure

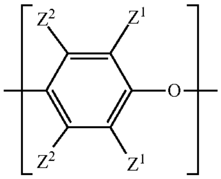

wherein each occurrence of $Z^1$ comprises halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl ($C_{6-30}$cycloalkenyl), or $C_{2-12}$ halohydrocarbyloxy wherein at least two carbon atoms separate the halogen and oxygen atoms, and each occurrence of $Z^2$ comprises hydrogen, halogen, unsubstituted or substituted $C_{1-12}$ primary or secondary hydrocarbyl, $C_{1-12}$ hydrocarbylthio, $C_{1-12}$ hydrocarbyloxy, $C_{1-6}$alkyl($C_{6-30}$cycloalkenyl), or $C_{2-12}$ halohydrocarbyloxy wherein at least two carbon atoms separate the halogen and oxygen atoms, and at least one of $Z^1$ and $Z^2$ is an unsubstituted or substituted $C_{1-6}$alkyl($C_{6-30}$cycloalkenyl);

the second repeating units have the structure

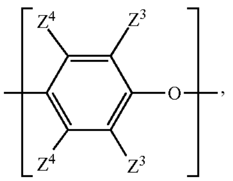

wherein each occurrence of $Z^3$ independently comprises halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms, and each occurrence of $Z^4$ independently comprises hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

3. The poly(phenylene ether) copolymer of claim 1 comprising formula (3b)

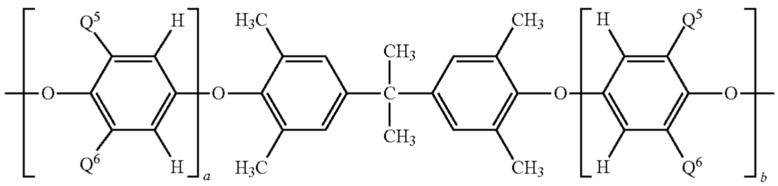

(3b)

wherein each occurrence of $Q^5$ and $Q^6$ is independently methyl, cyclohexyl, phenyl, di-n-butylaminomethyl, morpholinomethyl, or an unsubstituted or substituted $C_{1-6}$alkyl($C_{6-30}$cycloalkenyl); and each occurrence of a and b is independently 0-20, with the proviso that the sum of a and b is at least 2.

4. The poly(phenylene ether) copolymer of claim 1, wherein the second repeating units are derived from 2,6-dimethyl phenol, 2,3,6-trimethyl phenol, 2-phenyl-6-methyl phenol, 2-allyl-6-methyl phenol, or a combination thereof.

5. The poly(phenylene ether) copolymer of claim 1 comprising a polysiloxane block comprising:

repeating units of the formula

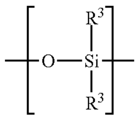

wherein each occurrence of $R^3$ is independently $C_{1-12}$ hydrocarbyl or $C_{1-12}$ halohydrocarbyl; and a terminal unit of the formula

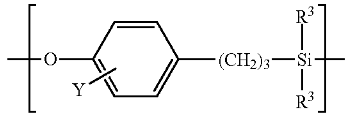

wherein:

Y is hydrogen, halogen, $C_{1-12}$ hydrocarbyl, or $C_{1-12}$ hydrocarbyloxy, and each occurrence of $R^3$ is independently hydrogen, $C_{1-12}$ hydrocarbyl, or $C_{1-12}$ halohydrocarbyl.

6. The poly(phenylene ether) copolymer of claim 1 comprising a polysiloxane block comprising the structure

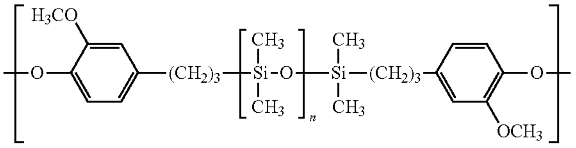

wherein n has an average value of 5-100, or 10-80 or 10-60.

7. The poly(phenylene ether) copolymer of claim 1, wherein the $C_{6-30}$ cycloalkenyl group is derived from a terpene, each optionally substituted with a $C_{1-12}$ primary or secondary hydrocarbyl, $C_{1-12}$ hydrocarbylthio, $C_{1-12}$ hydrocarbyloxy, or a combination thereof.

8. The poly(phenylene ether) copolymer of claim 1, wherein the first repeating units are derived from 2-$CH_2$($C_{6-30}$cycloalkenyl)-6-methyl phenol, 2-$CH_2$($C_{6-30}$cycloalkenyl)-3,6-dimethyl phenol, 3-$CH_2$($C_{6-30}$cycloalkenyl)-2,6-dimethyl phenol, 2-phenyl-6-$CH_2$($C_{6-30}$cycloalkenyl) phenol, or a combination thereof.

9. A method of preparing the poly(phenylene ether) copolymer of claim 1, comprising:

reacting a cycloaddition monomer precursor comprising an alkene or an alkyne with a conjugated diene via a cycloaddition reaction to provide a cycloaddition monomer product, wherein the cycloaddition monomer precursor comprises a monohydric phenol, a dihydric phenol, a bisphenol, or a combination thereof;

oxidatively polymerizing the cycloaddition monomer product with an unsubstituted or substituted monohydric phenol, a dihydric phenol, a bisphenol, or a combination thereof to provide a hydroxyl-terminated poly (phenylene ether) copolymer having an unsubstituted or substituted $C_{1-6}$alkyl($C_{6-30}$cycloalkenyl) pendant group; and optionally, reacting at least one hydroxyl terminal group of the hydroxyl-terminated poly(phenylene ether) copolymer having an unsubstituted or substituted $C_{1-6}$alkyl($C_{6-30}$cycloalkenyl) pendant group with a compound to provide poly(phenylene ether) copolymer having an unsubstituted or substituted $C_{1-6}$alkyl ($C_{6-30}$cycloalkenyl) pendant group and at least one terminal functional group.

10. A method of preparing the poly(phenylene ether) copolymer of any one of claim 1, comprising oxidatively polymerizing a polymerization precursor comprising an alkene or alkyne with a monohydric phenol, a dihydric phenol, a bisphenol, or a combination thereof, to provide a hydroxyl-terminated polymerized intermediate, wherein the polymerization precursor comprises a monohydric phenol, a dihydric phenol, a bisphenol, or a combination thereof;

reacting the hydroxyl-terminated polymerized intermediate with a conjugated diene via a cycloaddition reaction to provide a hydroxyl-terminated poly(phenylene ether) copolymer having an unsubstituted or substituted $C_{1-6}$alkyl($C_{6-30}$cycloalkenyl) pendant group; and optionally, reacting at least one hydroxyl terminal group of the hydroxyl-terminated polymerized intermediate with a compound to provide a poly(phenylene ether) copolymer having an unsubstituted or substituted $C_{1-6}$alkyl($C_{6-30}$cycloalkenyl) pendant group and at least one terminal functional group.

11. A curable composition comprising the poly(phenylene ether) copolymer of claim 1; and a curing promoter comprising an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination thereof.

12. The curable composition of claim 11, further comprising an auxiliary curable resin comprising an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof;

a curable unsaturated monomer comprising a monofunctional styrenic compound, a monofunctional (meth)acrylic compound, a polyfunctional allylic compound, a polyfunctional (meth)acrylate, a polyfunctional (meth)acrylamide, a polyfunctional styrenic compound, or a combination thereof;

or a combination thereof.

13. A thermoset composition comprising the curable composition of claim 11, wherein the thermoset composition has a glass transition temperature of greater than or equal to 180° C., as determined according to differential scanning calorimetry as per ASTM D3418 with a 20° C./min heating rate.

14. An article comprising the thermoset composition of claim 13, wherein the article is a composite, a foam, a fiber, a layer, a coating, an encapsulant, an adhesive, a sealant, a molded component, a prepreg, a casing, a laminate, a metal clad laminate, an electronic composite, or a structural composite.

15. A method for the manufacture of a thermoset composition, the method comprising curing the curable composition of claim 11.

* * * * *